March 29, 1966     H. J. PETRY     3,243,569

ELECTRIC ARC WELDING FLUX AND METHOD

Filed July 24, 1963

INVENTOR.
HOWARD J. PETRY,

BY

ATTORNEYS.

United States Patent Office 3,243,569
Patented Mar. 29, 1966

3,243,569
ELECTRIC ARC WELDING FLUX AND METHOD
Howard J. Petry, Eaton, Ohio, assignor to Rexarc, Incorporated, West Alexandria, Ohio, a corporation of Ohio
Filed July 24, 1963, Ser. No. 297,435
8 Claims. (Cl. 219—74)

This invention relates to an electric arc welding flux and a method of fluxing in electric arc welding.

It is known in welding that improved welds may be secured by the use of fluxes. Fluxes have the function of scavenging and deoxidizing the weld puddle so as to assist in producing sound welds.

It is also known to shield welds of all kinds from the atmosphere in order to prevent oxidation. This is sometimes accomplished by covering the arc and weld puddle with a flux in what is known as submerged arc welding and it is sometimes accomplished by what is known as gas shielding. In gas shielding, an envelope of an inert gas is provided to insulate the weld and weld puddle from the ambient air. The inert gas may be a monatomic gas such as argon or helium, or it may be a diatomic gas such as carbon dioxide or even dry air. Sometimes mixtures of argon and carbon dioxide are used, and in some cases a small amount of oxygen is included.

In electric arc welding, it is rather general to use coated weld rod wherein a flux is incorporated in the weld rod coating and it is not uncommon to provide an inert gas shield in electric arc welding.

When the inert gas used is argon or helium, much better results are obtained than with dry air or carbon dioxide because there is less danger of burn-through or excessive root sag and therefore 100% penetration can be attained. However, when dry air or carbon dioxide are used, there is considerable danger of excessive root sag and burn-through and it is therefore very difficult to get 100% penetration. Furthermore, with argon or helium as a shielding gas, the metal from the weld rod is in effect sprayed into the weld in fine particles whereas with dry air or carbon dioxide the weld metal is deposited in globules. The globule deposit makes for excessive spatter as a result of which the weld is not uniform.

With the foregoing considerations in mind, it is an object of the present invention to provide for the entrainment of a flux in vapor form in the shielding gas and to provide a method for accomplishing this entrainment. It is another object of the invention to provide a flux containing shielding gas which may be carbon dioxide or dry air such that the weld produced will be of the quality which heretofore could only be produced when using argon or helium as the shielding gas, as a result of which cost of shielding gas may be reduced tremendously without deleterious effects in the quality of the weld.

These and other objects of the invention which will be described in more detail hereinafter are accomplished by that composition and by that method of which the following describes certain exemplary embodiments.

Reference is made to the drawing forming a part hereof and in which.

Figure 1:
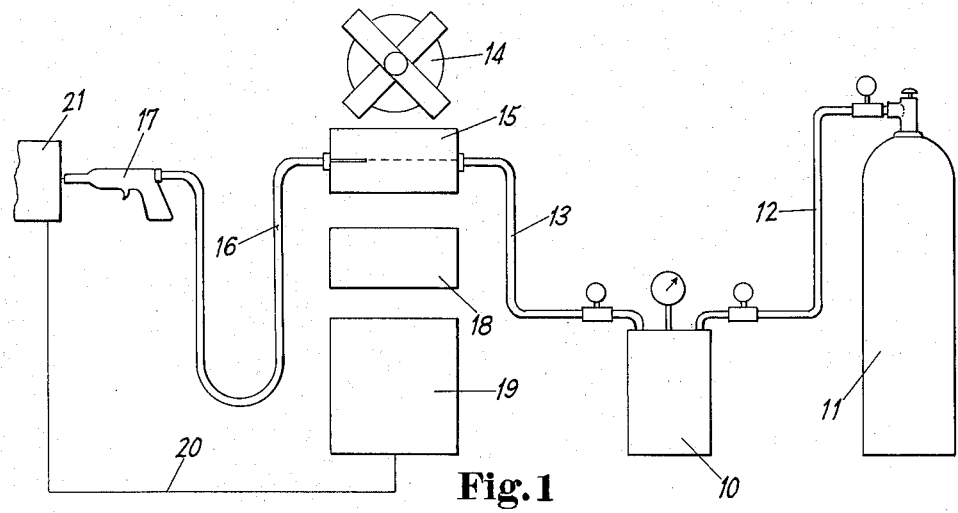
FIG. 1 is a schematic representation of the fluxing of a shielding gas.

Briefly, in the practice of the invention a flux containing one of the elements boron, fluorine or chlorine is used. Exemplary of such compounds there may be listed methyl borate, methallyl chloride, dichlorodifluoromethane, dichlorotetrafluoroethane, and trichlorotrifluoromethane. The flux may consist entirely of any one of such compounds or it may be a mixture in any proportion of any two or more of such compounds. In the compounds mentioned above, boron, chlorine or fluorine is incorporated in a carrier or vehicle which may be a ketone such, for example, as acetone, an alcohol such for example as methanol or ethanol or an aliphatic hydrocarbon such as hexane, for example. The above listed compounds are industrial compounds available on the open market and have been listed because of their ready availability and their suitability for the purpose. The flux compound may be disposed in a vessel such as indicated at 10 in FIG. 1 through which the shielding gas from a cylinder 11 is caused to bubble by passing into the vessel 10 through a pipe 12 and out through a pipe 13. A reel of welding wire is indicated at 14 and a wire feeder at 15. The wire is fed through a tube 16 and a gas with the flux entrained coming through the pipe 13 passes into the tube 16 to the welding nozzle gun 17. A suitable control for the welding apparatus is provided at 18 and a power source 19 which is connected through a ground 20 to the work 21.

As previously indicated, the gas in the cylinder 11 may be any one of the inert gases such as argon or helium which are relatively expensive but according to the present invention the gas in the cylinder 11 may be carbon dioxide or even dry air. As the gas passes through the vessel 10, it bubbles through the liquid contained therein and picks up a vapor which is thus entrained in the gas and passes with the gas in enveloping relation to the weld rod to and out through the nozzle 17.

Figure 2:
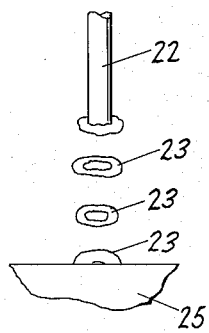
FIG. 2 is a diagrammatic view showing the globular deposition of weld metal such as is generally encountered with carbon dioxide as a shielding gas.
Figure 3:
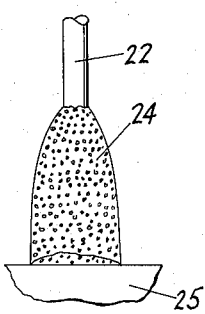
FIG. 3 is a view similar to FIG. 2 showing the deposition of weld metal in atomized form as can be achieved with argon as a shielding gas.

When carbon dioxide, for example, is used as the shielding gas, the deposition of weld metal takes place somewhat as shown in FIG. 2 with the weld metal leaving the weld rod 22 in globules 23 whereby a non-uniform weld bed is produced and whereby substantial spatter is caused. In FIG. 3 where, for example, argon is used as the shielding gas, the weld metal is deposited in the form of an atomized spray 24 so as to produce a uniform weld with minimum spatter. The work in both cases is indicated at 25.

Figure 4:
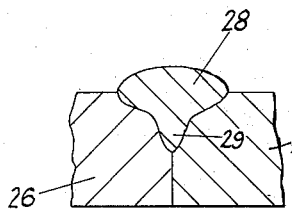
FIG. 4 shows a somewhat diagrammatic cross-section through a typical electric arc weld produced with argon as the shielding gas.
Figure 5:
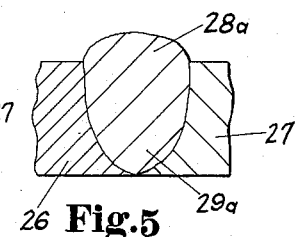
FIG. 5 shows a typical cross-section through a weld similar to FIG. 4 where carbon dioxide has been used for the weld.

In FIG. 4 there is shown a cross-section through a typical weld where argon was used as the shielding gas. The two pieces being joined are indicated at 26 and 27 and the weld nugget at 28. The tapered portion of the nugget 29 makes it possible to obtain better penetration with minimum danger of burn-through or root sag. For comparison there is shown in FIG. 5 a typical weld produced with $CO_2$. It will be clear from a study of FIG. 5 that because of the shape of the nugget 28a, with particular reference to the lower portion thereof at 29a, it is very difficult to obtain 100% penetration without burn-through or root sag.

Figure 6:
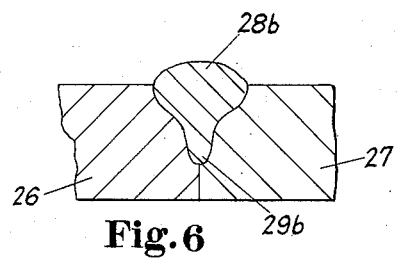
FIG. 6 is a view similar to FIGS. 4 and 5 showing a typical cross-section through a weld using a shielding gas and flux according to the present invention.

In FIG. 6 there is shown a typical cross-section through a weld produced with carbon dioxide as a shielding gas with entrained flux according to the present invention and it will be observed that the configuration of the weld nugget 28b is very similar to that of FIG. 4 where argon is used and the lower portion 29b is similarly shaped to that of FIG. 4 at 29. Thus, it is possible according to the present invention, to use the very much cheaper carbon dioxide or even dry air and to produce a weld of the quality heretofore produced only with argon or helium.

While the method of the present invention is not limited to particular welding methods, it is particularly suitable with methods currently designated as "Mig," "Tig" and "Short Arc."

While any of the carriers generally described above may be used, methanol is particularly desirable because it has a boiling point of 64.6° C. Among the ketones, acetone is particularly favored because it has a boiling point of 56.5° C. As a result of these low boiling points, these materials are readily entrained in the shielding gas.

The invention having now been fully described, what is claimed is:

1. A flux containing shielding gas for use in electric arc welding, comprising a diatomic shielding gas in which there is entrained in vapor form a flux compound containing an element chosen from the group consisting of boron, fluorine and chlorine, in a vehicle chosen from the group consisting of ketones, alcohols and aliphatic hydrocarbons.

2. A flux containing shielding gas according to claim 1, wherein said shielding gas is carbon dioxide.

3. A flux containing shielding gas according to claim 1, wherein said shielding gas is dry air.

4. The gas claimed in claim 1 wherein said flux comprises methyl borate.

5. The gas claimed in claim 1 wherein said flux comprises methallyl chloride.

6. The gas claimed in claim 1 wherein said flux comprises dichlorodifluoromethane.

7. The gas claimed in claim 1 wherein said flux comprises dichlorotetrafluoroethane.

8. The gas claimed in claim 1 wherein said flux comprises trichlorotrifluoromethane.

References Cited by the Examiner
UNITED STATES PATENTS

| | | | |
|---|---|---|---|
| 1,589,017 | 6/1926 | Lincoln | 219—74 |
| 1,963,729 | 6/1934 | Alexay | 219—74 |
| 2,664,370 | 12/1953 | Snell et al. | 148—23 |
| 2,745,769 | 5/1956 | Linnert et al. | 148—23 |
| 2,768,278 | 10/1956 | Gaines | 219—74 |
| 2,981,648 | 4/1961 | Peterson et al. | 148—23 |

OTHER REFERENCES

"Welding Engineer;" February 1943, pp. 58–59.
"Hackh's Chemical Dictionary," 3rd ed., 1944.

RICHARD M. WOOD, *Primary Examiner.*